Aug. 9, 1938.  S. C. FULTON ET AL  2,126,001
PROCESS FOR PRODUCING VALUABLE POLYMERS FROM OLEFINE MIXTURES
Filed Dec. 30, 1935
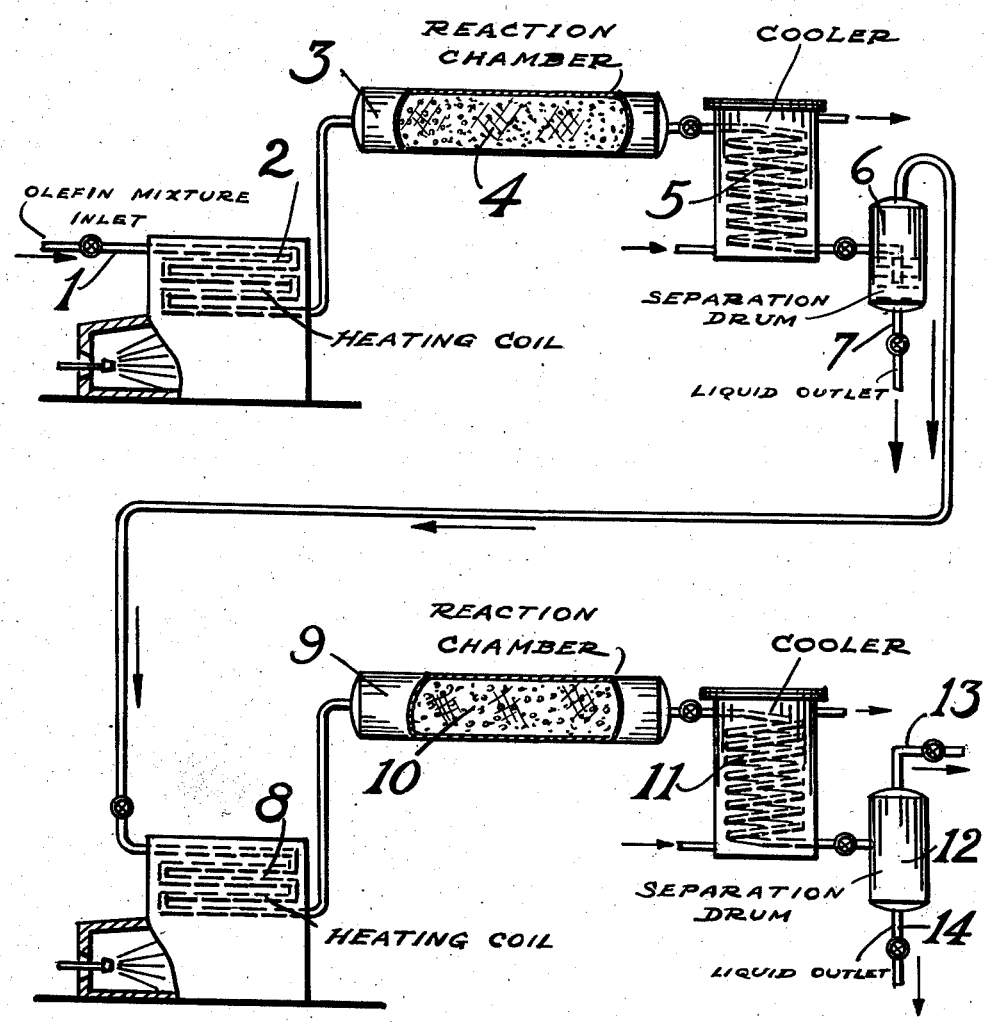

Patented Aug. 9, 1938

2,126,001

UNITED STATES PATENT OFFICE 2,126,001

PROCESS FOR PRODUCING VALUABLE POLYMERS FROM OLEFINE MIXTURES

Stewart C. Fulton, Elizabeth, N. J., and Thomas Cross, Jr., Baton Rouge, La., assignors to Standard Oil Development Company, a corporation of Delaware Application December 30, 1935, Serial No. 56,730

3 Claims. (Cl. 196—10)

The present invention relates to a method for producing valuable hydrocarbon polymers from gaseous olefines, especially mixtures containing both iso- and normal olefines. The invention will be fully understood from the following description.

The drawing is a diagrammatic view indicating the steps and flow of materials through the process.

It is known that olefines may be polymerized to form light, low boiling liquids suitable for motor fuels. It has been found that among the various olefines, iso-olefines of the type of isobutylene polymerize to produce fractions of greater blending value than can be obtained from the normal olefine fractions. The superiority of the iso-olefine polymers lies in the fact that they are endowed with a greater blending value for knock suppression in automotive engines. Olefines suitable for polymerization can be produced from the corresponding alcohols by dehydration, and in this way substantially pure olefine fractions can be obtained. However, the cheapest source of olefine is the cracked distillates which are obtained in the cracking of hydrocarbon oils to produce motor fuels. In these products the iso- and normal olefines are intermixed, and it is extremely difficult to separate them to obtain relatively pure fractions. For this reason, it is highly desirable to selectively polymerize in some manner the olefines of one type or the other.

A hydrocarbon fraction obtained in the stabilization of cracked gasolines is largely available to refineries and has proved to be a source for materials for the present process. This material consists of the butane and butylene cut from the cracked naphtha, although its composition may vary from time to time depending upon the conditions of cracking and the efficiency of fractionation. It ordinarily will contain from 10 to 15% of isobutylene, with 20 to 40% of normal butylenes, the balance being made up largely of butanes with perhaps small amounts of propane, propylene, pentane and pentenes, and isopentane.

It has now been found that in mixtures of olefines conditions can be used under which the normal olefines can be caused to polymerize and the iso-olefines do not react. The polymers so produced in the first instance are predominantly derived from the normal olefines although these may be more or less of the isobutylene polymer as well. The olefines contained in the off-gas of such process are much concentrated in respect to iso-constituents and subsequently yield a polymer which contains a larger amount of material derived from iso-olefines and is much superior to the former polymer as a blending stock.

Referring to the drawing, numeral 1 denotes a pipe through which a mixture of olefines containing both normal and iso-constituents is found, preferably under normal and slightly elevated pressure. The olefine mixture passes preferably at atmospheric pressure through a heating coil 2 in which the temperature is raised to at least 200° C. and preferably higher, say 250 to 300° C. The heated mixture now passes through a catalyst chamber 3 in which the catalyst is indicated at 4. The nature of the catalyst will be more specifically described below. The reaction mixture passes from the reaction chamber into a cooler 5 so as to condense the polymer, and thus is allowed to separate into a chamber 6, from which the liquid is drawn off to pipe 7 to suitable storage not shown. The gas may be compressed and scrubbed with oil to remove any polymer which has not been removed in the cooler but this is not necessary. The off-gas which is now richer in the iso-constituents may be preheated in coil 8 and passed through a second catalytic zone 9 at a lower temperature than that prevailing in the previous zone. It is, for example, at a temperature below 200° C. and preferably from about 80 to 150° C. The catalytic agent which is indicated at 10 may be the same as that used in the previous reaction, or a different material may be employed. As before, the polymer is cooled at 11 and separated from the residual gas in a separated drum 12. The gases are drawn by pipe 13 for burning or utilization as desired, and the liquid is withdrawn to storage by pipe 14.

The essential point in the present process is the discovery that at relatively elevated temperatures, for example 200° C., iso-olefines have little tendency to polymerize. The reason for this is not fully understood but the fact remains that such olefines differ from the normal olefines which polymerize more and more rapidly as temperature is increased. The iso-olefines on the other hand, while polymerizing rapidly at low temperatures, for example up to 150 or 200° C., do not polymerize to any substantial extent at the more elevated temperatures. The temperatures given herein are those obtained at normal or atmospheric pressure. If pressure is increased the iso-olefines tend to polymerize to a greater extent, even at temperatures above 200° C., but considerable pressure is necessary to bring about the reaction, and it is most advantageous to carry out the present process at pressures below ‎‎‎‎‎0 lbs./sq. in. and preferably at atmospheric pressure or under only such pressure as is required to force the reactants through the apparatus.

The temperature of the first reaction step should be above 200° C. as mentioned above, but the reaction may occur at considerably higher temperatures, the only limit being the temperature at which secondary reactions occur, such as the splitting, dehydrogenation or carbonization of the polymer. As a practical limit it is believed that the temperature of about 400° C. is as high as should be employed. The time allowed for the first reaction will depend largely on the temperature and the activity of the particular catalyst used. The present process will be increasingly desirable in proportion to the degree to which it is possible to selectively polymerize the normal olefines in the first stage in order to obtain increased concentration of iso-olefines in the latter stages, and therefore the time should be long enough to obtain as complete and full a polymerization of the normal olefines as possible. This may vary from 5 to 100 seconds, depending upon the temperature, catalyst and concentration of the olefines in the gas mixture. In this way the polymerization of the normal olefine may be brought about to the extent of 60 to 90% with a polymerization of only 10 to 20% of iso-olefines. In the second stage the time may vary from about 5 to 50 seconds, and it is, of course, preferable to allow sufficient time to obtain the full polymerization of the iso-constituents, and the temperature below 200° C., preferably from 50 to 150° C.

Various catalysts may be used for the present process such as difficultly reducible oxides of the third and fourth groups of the periodic table, especially aluminum, lanthanum and zirconium preferably as oxides and supported in silica, diatomaceous earth or the like. The rare earths are also useful alone or in admixtures with alumina or zirconia or with zinc oxides. Phosphoric acid supported on charcoal or diatomaceous earth or other carriers is useful; also aluminum chloride on pumice or silica or metallic aluminum and cadmium on silica.

In the present process the object is to produce two fractions of polymer, the first of lesser blending or anti-knock value, and the second of greater anti-knock value. While it is preferred to polymerize the whole of the normal olefine content or as much as possible thereof in the first stage, this is not necessary to the process. It is desirable in most instances to obtain the greatest spread between the blending values of the first and second fractions. The first, for example, may be used in blends with ordinary cracked gasolines which are improved somewhat by the addition of the normal olefine polymer. The second polymer may be used, if desired, only in connection with premium gasoline, for example, for use in airplanes or racing cars. It may be found in some localities that there is not sufficient need for the full blending value of the second stock, and if this be the case conditions may be arranged so as not to obtain the full polymerization of the normal olefines in the first stage. Subsequently a blend of normal and iso-constituents may then be obtained in the second stage of polymerization. Under certain conditions such a polymer might be sufficient for the purposes of any particular refinery.

The same object may be obtained by producing the polymers with the greatest possible spread in blending values, and then adding a portion of the first to the second, or of the second to the first, in order to obtain any desired blending value.

The polymers may be used as obtained or they may be hydrogenated, preferably by use of catalysts such as nickel or cobalt or metals of the sixth group or oxides and sulphides thereof. It is of especial interest to hydrogenate the polymer fraction which is rich in the iso-olefinic constituent because its octane number is greatly increased by hydrogenation. The other fraction such as normal olefine polymers and poor in iso-constituents, will be improved or not depending on the composition. If, for example, the selectivity is high there will be only a small proportion of iso-constituent in the polymer obtained at the same elevated temperature and hydrogenation thereof may actually decrease the octane number. In this manner it is possible to hydrogenate only those polymer fractions which are improved thereby and avoid hydrogenation of those which are not. In reblending the final products a higher octane number will be obtained than could be obtained by total hydrogenation of the total polymer.

*Example.*—A gas mixture consisting of butane and butylenes was passed over a catalyst consisting of aluminum oxides supported on silica. The temperature was about 250° C. The total olefine in the inlet gas was 38.5% and of this 72.5% was normal butylene and 27.5% isobutylene. The polymer produced in this stage was separated by chilling and the remaining gases showed a total olefine content of 24.7, of which 53.4% was normal butylene and 46.6% isobutylene. This gas was passed over the same catalyst but at a lower temperature of about 150° C., and a substantially complete polymerization of the olefine was obtained. The second polymer was likewise separated from the gas which now consisted of substantially saturated hydrocarbons.

The total polymer obtained from the gas was practically 100% of the olefines therein and amounted to 38.5% of the inlet gas. If this polymer had been obtained in a single polymerization step, it would have consisted of three volumes normal polymers and about one volume of iso-constituents. The octane number of such a blend would be approximately 83. On hydrogenation this goes to 83.5. According to the present process, however, two polymer fractions were obtained: The first consisted of about 93.5% normal constituents and 6.5% of iso-constituents, and amounted to about one-half of the total polymer obtained. This polymer had an octane number of approximately 82 which on hydrogenation goes to 79.5. The second polymer consisted of about equal proportions of normal and iso-constituents, and was about equal in volume to the first polymer. It had an octane number of 84 and on hydrogenation becomes 89. It will be noted from the above example that the present process enables the operator to obtain the polymer in two fractions, one of which is much superior to the other in octane number or blending value.

If the total polymer is hydrogenated a value of 83.5 is obtained but if the one rich in iso-constituent is hydrogenated and is then blended with the unhydrogenated polymer which is poor in iso-constituent the blend has a value of 86 octane number.

The present invention is not to be limited to any theory of the mechanism of reaction going on in the first or second stages, nor to a catalytic mixture, nor to a particular olefine or source, but only to the following claims in which there is claimed all novelty in the invention.

We claim:

1. An improved process for obtaining valuable polymers from hydrocarbon mixtures comprising polymerizing a mixture of iso and normal olefines at normal atmospheric pressure and at a temperature between 200 and 350° C., the time being sufficient to polymerize a substantial proportion of the normal olefines, separating the olefine polymer obtained and then polymerizing the remaining olefines at a temperature between about 50 and 150° C. and separating this polymer from the residual products.

2. An improved process for obtaining valuable polymers from hydrocarbon gases, comprising passing a mixture containing from 20 to 40% of normal butenes with 10 to 15 of iso-butylene over a polymerization catalyst at about normal pressure and at temperatures between 200 and 350° C., cooling the reaction product to condense the polymer, separating the polymer, then passing the residual mixture containing an increased proportion of iso-olefines over a second polymerization catalyst at temperatures from about 50 to 150° C. for a time sufficient to condense the remaining olefines, cooling and separating said polymer from residual gas.

3. An improved process for producing valuable polymers from olefines mixtures comprising passing a mixture of normal and iso olefines over a solid polymerization catalyst at a temperature between 200° and 350° C. adapted to polymerize normal olefines but at which iso olefines are not substantially affected, separating the polymers so produced, polymerizing the remaining olefines at a temperature between about 50° and 200° C. and separating this polymer fraction.

STEWART C. FULTON.
THOMAS CROSS, Jr.